United States Patent
Zadesky et al.

(10) Patent No.: US 10,189,743 B2
(45) Date of Patent: Jan. 29, 2019

(54) ENHANCED STRENGTHENING OF GLASS

(75) Inventors: Stephen Paul Zadesky, Portola Valley, CA (US); Christopher Prest, San Francisco, CA (US); Douglas Weber, Arcadia, CA (US)

(73) Assignee: APPLE INC., Cupertino, CA (US)

( * ) Notice: Subject to any disclaimer, the term of this patent is extended or adjusted under 35 U.S.C. 154(b) by 6 days.

(21) Appl. No.: 12/895,823

(22) Filed: Sep. 30, 2010

(65) Prior Publication Data

US 2011/0067447 A1   Mar. 24, 2011

Related U.S. Application Data

(60) Provisional application No. 61/374,988, filed on Aug. 18, 2010.

(51) Int. Cl.
| C03C 21/00 | (2006.01) |
| H04M 1/18 | (2006.01) |
| H04M 1/02 | (2006.01) |

(52) U.S. Cl.
CPC .......... *C03C 21/001* (2013.01); *C03C 21/002* (2013.01); *H04M 1/185* (2013.01); *H04M 1/0266* (2013.01)

(58) Field of Classification Search
CPC ... C03C 21/001; C03C 21/992; C03C 21/002; C03C 21/005; H04M 1/185; H04M 1/0266
USPC ..................................... 65/30.14, 30.1, 30.13
See application file for complete search history.

(56) References Cited

U.S. PATENT DOCUMENTS

| 2,643,020 A | | 6/1953 | Dalton | |
| 3,415,637 A | * | 12/1968 | Glynn | ........................ 65/30.14 |
| 3,441,398 A | | 4/1969 | Hess | |
| 3,467,508 A | | 9/1969 | Loukes et al. | |
| 3,498,773 A | * | 3/1970 | La Due et al. | .............. 65/30.14 |
| 3,558,415 A | * | 1/1971 | Rieser et al. | ................... 28/215 |
| 3,607,172 A | * | 9/1971 | Poole et al. | ................. 65/30.14 |
| 3,619,240 A | | 11/1971 | Toussaint et al. | |
| 3,626,723 A | | 12/1971 | Plumat | |
| 3,652,244 A | | 3/1972 | Plumat | |

(Continued)

FOREIGN PATENT DOCUMENTS

| AT | 283 630 B | 10/1970 |
| CN | 1277090 A | 12/2000 |

(Continued)

OTHER PUBLICATIONS

Arun K. Varshneya, Chemical Strengthening of Glass: Lessons Learned and Yet to Be Learned, International Journal of Applied Glass Science, 2010, 1, 2, pp. 131-142.*

(Continued)

*Primary Examiner* — Michael H. Wilson
*Assistant Examiner* — Yana B Krinker
(74) *Attorney, Agent, or Firm* — Brownstein Hyatt Farber Schreck, LLP

(57) ABSTRACT

Apparatus, systems and methods for improving strength of a thin glass member for an electronic device are disclosed. In one embodiment, the glass member can have improved strength by using multi-bath chemical processing. The multi-bath chemical processing allows greater levels of strengthening to be achieved for glass member. In one embodiment, the glass member can pertain to a glass cover for a housing of an electronic device.

20 Claims, 9 Drawing Sheets

(56) References Cited

U.S. PATENT DOCUMENTS

| | | | |
|---|---|---|---|
| 3,753,840 A | 8/1973 | Plumat | |
| 3,798,013 A * | 3/1974 | Inoue et al. | 65/30.14 |
| 3,843,472 A * | 10/1974 | Toussaint et al. | 28/192 |
| 3,857,689 A | 12/1974 | Koizumi et al. | |
| 3,926,605 A | 12/1975 | Kunkle | |
| 3,951,707 A | 4/1976 | Kurtz et al. | |
| 4,015,045 A * | 3/1977 | Rinehart | 428/410 |
| 4,052,184 A | 10/1977 | Anderson | |
| 4,119,760 A * | 10/1978 | Rinehart | 428/410 |
| 4,156,755 A | 5/1979 | Rinehart | |
| 4,165,228 A | 8/1979 | Ebata et al. | |
| 4,148,082 A | 12/1979 | Ganswein et al. | |
| 4,212,919 A | 7/1980 | Hoda | |
| 4,218,230 A | 8/1980 | Hogan | |
| 4,346,601 A | 8/1982 | France | |
| 4,353,649 A | 10/1982 | Kishii | |
| 4,425,810 A | 1/1984 | Simon et al. | |
| 4,537,820 A | 8/1985 | Nowobliski et al. | |
| 4,646,722 A | 3/1987 | Silverstein et al. | |
| 4,671,814 A * | 6/1987 | Aratani et al. | 65/30.14 |
| 4,733,973 A | 3/1988 | Machak et al. | |
| 4,842,629 A | 6/1989 | Clemens et al. | |
| 4,844,724 A | 7/1989 | Sakai et al. | |
| 4,846,868 A | 7/1989 | Aratani | |
| 4,849,002 A * | 7/1989 | Rapp | 65/30.13 |
| 4,872,896 A * | 10/1989 | LaCourse et al. | 65/30.14 |
| 4,911,743 A | 3/1990 | Bagby | |
| 4,937,129 A | 6/1990 | Yamazaki | |
| 4,957,364 A | 9/1990 | Chesler | |
| 4,959,548 A | 9/1990 | Kupperman et al. | |
| 4,983,197 A | 1/1991 | Froning et al. | |
| 4,986,130 A | 1/1991 | Engelhaupt et al. | |
| 5,041,173 A | 8/1991 | Shikata et al. | |
| 5,104,435 A | 4/1992 | Oikawa et al. | |
| 5,129,934 A | 7/1992 | Koss | |
| 5,157,746 A | 10/1992 | Tobita et al. | |
| 5,160,523 A | 11/1992 | Honkanen et al. | |
| 5,254,149 A | 10/1993 | Hashemi et al. | |
| 5,269,888 A | 12/1993 | Morasca | |
| 5,281,303 A | 1/1994 | Beguin et al. | |
| 5,369,267 A | 11/1994 | Johnson et al. | |
| 5,411,563 A | 5/1995 | Yeh | |
| 5,437,193 A | 8/1995 | Schleitweiler et al. | |
| 5,445,871 A | 8/1995 | Murase et al. | |
| 5,483,261 A | 1/1996 | Yasutake | |
| 5,488,204 A | 1/1996 | Mead et al. | |
| 5,525,138 A | 6/1996 | Hashemi et al. | |
| 5,625,154 A | 4/1997 | Matsuhiro et al. | |
| 5,654,057 A | 8/1997 | Kitayama | |
| 5,725,625 A | 3/1998 | Kitayama et al. | |
| 5,733,622 A * | 3/1998 | Starcke et al. | 428/64.1 |
| 5,766,493 A | 6/1998 | Shin | |
| 5,780,371 A | 7/1998 | Rifqi et al. | |
| 5,816,225 A | 10/1998 | Koch et al. | |
| 5,825,352 A | 10/1998 | Bisset et al. | |
| 5,826,601 A | 10/1998 | Muraoka et al. | |
| 5,835,079 A | 11/1998 | Shieh | |
| 5,880,411 A | 3/1999 | Gillespie et al. | |
| 5,880,441 A | 3/1999 | Gillespie et al. | |
| 5,930,047 A | 7/1999 | Gunz et al. | |
| 5,953,094 A | 9/1999 | Matsuoka et al. | |
| 5,985,014 A | 11/1999 | Ueda et al. | |
| 6,050,870 A | 4/2000 | Suginoya et al. | |
| 6,114,039 A * | 9/2000 | Rifqi | 428/410 |
| 6,120,908 A | 9/2000 | Papanu et al. | |
| 6,166,915 A | 12/2000 | Lake et al. | |
| 6,188,391 B1 | 2/2001 | Seely et al. | |
| 6,245,313 B1 | 6/2001 | Suzuki et al. | |
| 6,287,674 B1 | 9/2001 | Verlinden et al. | |
| 6,307,590 B1 | 10/2001 | Yoshida | |
| 6,310,610 B1 | 10/2001 | Beaton et al. | |
| 6,323,846 B1 | 11/2001 | Westerman et al. | |
| 6,325,704 B1 | 12/2001 | Brown et al. | |
| 6,327,011 B2 | 12/2001 | Kim | |
| 6,350,664 B1 | 2/2002 | Haji et al. | |
| 6,393,180 B1 | 5/2002 | Farries et al. | |
| 6,429,840 B1 | 8/2002 | Sekiguchi | |
| 6,437,867 B2 | 8/2002 | Zeylikovich et al. | |
| 6,516,634 B1 * | 2/2003 | Green et al. | 65/30.14 |
| 6,521,862 B1 | 2/2003 | Brannon | |
| 6,621,542 B1 | 9/2003 | Aruga | |
| 6,690,387 B2 | 2/2004 | Zimmerman et al. | |
| 6,718,612 B2 | 4/2004 | Bajorek | |
| 6,769,274 B2 | 8/2004 | Cho et al. | |
| 6,772,610 B1 | 8/2004 | Albrand et al. | |
| 6,810,688 B1 * | 11/2004 | Duisit et al. | 65/30.13 |
| 6,936,741 B2 | 8/2005 | Munnig et al. | |
| 6,955,971 B2 | 10/2005 | Ghyselen et al. | |
| 6,996,324 B2 | 2/2006 | Hiraka et al. | |
| 7,012,700 B2 | 3/2006 | De Groot et al. | |
| 7,013,709 B2 | 3/2006 | Hajduk et al. | |
| 7,015,894 B2 | 3/2006 | Morohoshi | |
| 7,070,837 B2 | 7/2006 | Ross | |
| 7,166,531 B1 | 1/2007 | van Den Hoek et al. | |
| 7,184,064 B2 | 2/2007 | Zimmerman et al. | |
| 7,461,564 B2 | 12/2008 | Glaesemann | |
| 7,558,054 B1 | 7/2009 | Prest et al. | |
| 7,626,807 B2 | 12/2009 | Hsu | |
| 7,663,607 B2 | 2/2010 | Hotelling et al. | |
| 7,810,355 B2 | 10/2010 | Feinstein et al. | |
| 7,872,644 B2 | 1/2011 | Hong et al. | |
| 7,918,019 B2 | 4/2011 | Chang et al. | |
| 8,013,834 B2 | 9/2011 | Kim | |
| 8,110,268 B2 | 2/2012 | Hegemier et al. | |
| 8,111,248 B2 | 2/2012 | Lee et al. | |
| 8,312,743 B2 | 11/2012 | Pun et al. | |
| 8,391,010 B2 | 3/2013 | Rothkopf | |
| 8,393,175 B2 | 3/2013 | Kohli et al. | |
| 8,551,283 B2 | 10/2013 | Pakula et al. | |
| 8,673,163 B2 | 3/2014 | Zhong | |
| 8,684,613 B2 | 4/2014 | Weber et al. | |
| 8,824,140 B2 | 9/2014 | Prest | |
| 9,128,666 B2 | 9/2015 | Werner | |
| 2002/0035853 A1 | 3/2002 | Brown et al. | |
| 2002/0105793 A1 | 8/2002 | Oda | |
| 2002/0155302 A1 | 10/2002 | Smith et al. | |
| 2002/0157199 A1 | 10/2002 | Piltingsrud | |
| 2003/0024274 A1 | 2/2003 | Cho et al. | |
| 2003/0057183 A1 | 3/2003 | Cho et al. | |
| 2003/0077453 A1 | 4/2003 | Oaku et al. | |
| 2003/0234771 A1 | 12/2003 | Mulligan et al. | |
| 2004/0051944 A1 | 3/2004 | Stark | |
| 2004/0119701 A1 | 6/2004 | Mulligan et al. | |
| 2004/0137828 A1 | 7/2004 | Takashashi et al. | |
| 2004/0142118 A1 | 7/2004 | Takechi | |
| 2004/0163414 A1 | 8/2004 | Eto et al. | |
| 2005/0058423 A1 | 3/2005 | Brinkmann et al. | |
| 2005/0105071 A1 | 5/2005 | Ishii | |
| 2005/0135724 A1 | 6/2005 | Helvajian et al. | |
| 2005/0174525 A1 | 8/2005 | Tsuboi | |
| 2005/0193772 A1 | 9/2005 | Davidson et al. | |
| 2005/0245165 A1 | 11/2005 | Harada et al. | |
| 2005/0259438 A1 | 11/2005 | Mizutani | |
| 2005/0285991 A1 | 12/2005 | Yamazaki | |
| 2006/0026521 A1 | 2/2006 | Hotelling et al. | |
| 2006/0055936 A1 | 3/2006 | Yun et al. | |
| 2006/0063009 A1 * | 3/2006 | Naitou et al. | 428/427 |
| 2006/0063351 A1 | 3/2006 | Jain | |
| 2006/0070694 A1 | 4/2006 | Rehfeld et al. | |
| 2006/0097991 A1 | 5/2006 | Hotelling et al. | |
| 2006/0197753 A1 | 9/2006 | Hotelling et al. | |
| 2006/0227331 A1 | 10/2006 | Wollmer et al. | |
| 2006/0238695 A1 | 10/2006 | Miyamoto | |
| 2006/0250559 A1 | 11/2006 | Bocko et al. | |
| 2006/0268528 A1 | 11/2006 | Zadeksky et al. | |
| 2006/0292822 A1 | 12/2006 | Xie | |
| 2007/0003796 A1 | 1/2007 | Isono et al. | |
| 2007/0013822 A1 | 1/2007 | Kawata et al. | |
| 2007/0029519 A1 | 2/2007 | Kikuyama et al. | |
| 2007/0030436 A1 | 2/2007 | Sasabayashi | |
| 2007/0039353 A1 | 2/2007 | Kamiya | |
| 2007/0046200 A1 | 3/2007 | Fu et al. | |
| 2007/0063876 A1 | 3/2007 | Wong | |
| 2007/0089827 A1 | 4/2007 | Funatsu | |

(56) References Cited

U.S. PATENT DOCUMENTS

| | | |
|---|---|---|
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135157 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1* | 9/2008 | Crouser et al. ............ 156/275.5 |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1* | 2/2009 | Bolton ......................... 349/158 |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1* | 8/2009 | Amin et al. .................. 428/142 |
| 2009/0202808 A1* | 8/2009 | Glaesemann et al. ........ 428/220 |
| 2009/0220761 A1 | 9/2009 | Dejneka et al. |
| 2009/0257189 A1 | 10/2009 | Wang et al. |
| 2009/0294420 A1 | 12/2009 | Abramov et al. |
| 2009/0324899 A1 | 12/2009 | Feinstein et al. |
| 2009/0324939 A1 | 12/2009 | Feinstein et al. |
| 2010/0009154 A1* | 1/2010 | Allan et al. ................... 428/220 |
| 2010/0024484 A1 | 2/2010 | Kashima |
| 2010/0028607 A1* | 2/2010 | Lee et al. ...................... 428/156 |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1 | 7/2010 | Sellier et al. |
| 2010/0206008 A1 | 8/2010 | Harvey et al. |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0285275 A1 | 11/2010 | Baca et al. |
| 2010/0296027 A1 | 11/2010 | Matsuhira et al. |
| 2010/0315570 A1 | 12/2010 | Dinesh et al. |
| 2010/0321305 A1 | 12/2010 | Chang et al. |
| 2011/0003619 A1 | 1/2011 | Bolton |
| 2011/0012873 A1 | 1/2011 | Prest et al. |
| 2011/0019123 A1 | 1/2011 | Prest et al. |
| 2011/0019354 A1 | 1/2011 | Prest et al. |
| 2011/0030209 A1 | 2/2011 | Chang et al. |
| 2011/0050657 A1 | 3/2011 | Yamada |
| 2011/0063550 A1 | 3/2011 | Gettemy et al. |
| 2011/0067447 A1 | 3/2011 | Zadesky et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0227399 A1 | 2/2012 | Yeates |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |
| CN | 101523275 | 2/2009 |
| CN | 101465892 | 6/2009 |
| CN | 102117104 A | 7/2011 |
| CN | 102131357 | 7/2011 |
| CN | 101267509 | 8/2011 |
| CN | 1322339 A | 11/2011 |
| CN | 202799425 U | 3/2013 |
| CN | 103958423 A | 7/2014 |
| DE | 14 96 586 A1 | 6/1969 |
| DE | 17 71 268 A1 | 12/1971 |
| DE | 32 12 612 A1 | 10/1983 |
| DE | 103 22 350 A1 | 12/2004 |
| EP | 1038663 A2 | 9/2000 |
| EP | 1 206 422 B1 | 11/2002 |
| EP | 1 593 658 A1 | 11/2005 |
| EP | 1592073 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2233447 | 9/2010 |
| EP | 2483216 | 8/2012 |
| EP | 2635540 | 9/2013 |
| FR | 2 797 627 A1 | 2/2001 |
| FR | 2 801 302 A1 | 5/2001 |
| JP | B S42-011599 | 6/1963 |
| JP | B-S48-006925 | 3/1973 |
| JP | 55031944 | 3/1980 |
| JP | 55 067529 | 5/1980 |
| JP | 55-95645 | 7/1980 |
| JP | A S55-136979 | 10/1980 |
| JP | 55 144450 | 11/1980 |
| JP | A S59-013638 | 1/1984 |
| JP | 59037451 | 2/1984 |
| JP | A S61-097147 | 5/1986 |
| JP | 6066696 | 10/1986 |
| JP | A S63-106617 | 5/1988 |
| JP | 63222234 | 9/1988 |
| JP | 5-32431 | 2/1993 |
| JP | 05249422 | 9/1993 |
| JP | 6242260 A | 9/1994 |
| JP | A H07-050144 | 2/1995 |
| JP | 8-274054 | 10/1996 |
| JP | 52031757 | 3/1997 |
| JP | A-H09-073072 | 3/1997 |
| JP | A H09-507206 | 7/1997 |
| JP | 09-312245 | 12/1997 |
| JP | A H11-281501 | 10/1999 |
| JP | A 2000-086261 | 3/2000 |
| JP | 2000-163031 | 6/2000 |
| JP | 200203895 A | 7/2000 |
| JP | A 2001-083887 | 3/2001 |
| JP | A 2002-160932 | 6/2002 |
| JP | 2002-342033 | 11/2002 |

(56) References Cited

FOREIGN PATENT DOCUMENTS

| | | |
|---|---|---|
| JP | A 2002-338283 | 11/2002 |
| JP | A2003502257 | 1/2003 |
| JP | A2003-146705 | 5/2003 |
| JP | A 2004-094256 | 3/2004 |
| JP | A2004-259402 | 9/2004 |
| JP | A 2004-292247 | 10/2004 |
| JP | A2004-339019 | 12/2004 |
| JP | 2005-165249 | 6/2005 |
| JP | A 2005-156766 | 6/2005 |
| JP | A 2005140901 | 6/2005 |
| JP | 2005-353592 | 12/2005 |
| JP | A 2000-348338 | 12/2005 |
| JP | 2007-099557 | 4/2007 |
| JP | 2008-001590 | 1/2008 |
| JP | 2008007360 | 1/2008 |
| JP | 2008-63166 A | 3/2008 |
| JP | 2008-066126 A | 3/2008 |
| JP | 2008-192194 | 8/2008 |
| JP | A 2008-195602 | 8/2008 |
| JP | A 2008-216938 | 9/2008 |
| JP | A 2008-306149 | 12/2008 |
| JP | A 2009-167086 | 7/2009 |
| JP | A 2009-234856 | 10/2009 |
| JP | A2009230341 | 10/2009 |
| JP | 2010 064943 | 3/2010 |
| JP | A 2010-060908 | 3/2010 |
| JP | A 2010-116276 | 5/2010 |
| JP | U 3162733 | 8/2010 |
| JP | 2010/195600 | 9/2010 |
| JP | A 2010-237493 | 10/2010 |
| JP | 2011-032124 | 2/2011 |
| JP | A 2011-032140 | 2/2011 |
| JP | A 2011-158799 | 8/2011 |
| JP | 2011-527661 | 11/2011 |
| JP | A 2011-231009 | 11/2011 |
| JP | A 2013-537723 | 10/2013 |
| KR | 2010-2006-005920 | 1/2006 |
| KR | 10-2010-0019526 | 2/2010 |
| KR | 10-2011-0030919 | 3/2011 |
| TW | 201007521 A | 2/2010 |
| TW | 201235744 A1 | 9/2012 |
| WO | WO 02/42838 A1 | 5/2002 |
| WO | WO 2004/014109 | 2/2004 |
| WO | WO 2004-061806 | 7/2004 |
| WO | WO 2004/106253 A | 12/2004 |
| WO | WO 2004106253 A1 * 12/2004 ............. C03C 21/00 | |
| WO | WO 2007/089054 A1 | 8/2007 |
| WO | WO 2008/044694 A | 4/2008 |
| WO | WO 2008/143999 A1 | 11/2008 |
| WO | WO 2009/003029 | 12/2008 |
| WO | WO 2009/078406 | 6/2009 |
| WO | WO 2009/099615 | 8/2009 |
| WO | WO 2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO 2010/080988 | 7/2010 |
| WO | WO 2010/101961 | 9/2010 |
| WO | WO 2011/008433 | 1/2011 |
| WO | WO 2010/027565 | 2/2011 |
| WO | WO 2011/041484 A1 | 4/2011 |
| WO | WO 2012/015960 | 2/2012 |
| WO | WO 2012/027220 A2 | 3/2012 |
| WO | WO 2012/106280 | 8/2012 |
| WO | WO 2013/106242 A2 | 7/2013 |

OTHER PUBLICATIONS

International Search Report and Written Opinion for International Application No. PCT/US2011/047479, dated Nov. 11, 2011.
Chemically Strengthened Glass, Wikipedia, Apr. 19, 2009, http://en/wikipedia.org/w/index.php?title=Chemically_strengthened_glass&oldid=284794988.
Wikipedia: "Iphone 4", www.wikipedia.org, retrieved Oct. 31, 2011, 15 pgs.
"Toward Making Smart Phone Touch-Screens More Glare and Smudge Resistant", e! Science News, http://eciencenews.com/articles/2009/08/19toward.making.smart.phone.touch.screens.more.glare.and.smudge.resistant, Aug. 19, 2009, 1 pg.
Aben "Laboratory of Photoelasticity", Institute of Cybernetics at TTU, www.ioc.ee/res/photo.html, Oct. 5, 2000.
Forooghian et al., Investigative Ophthalmology & Visual Science; Oct. 2008, vol. 49, No. 10.
Saxer et al., "High-Speed Fiber-Based Polarization-sensitive optical coherence tomography of in vivo human skin", Optics Letters, vol. 25, No. 18, Sep. 15, 2000, pp. 1355-1357.
Ohkuma, "Development of a Manufacturing Process of a Thin, Lightweight LCD Cell", Department of Cell Process Development, IBM, Japan, Section 13.4.
Lee et al., "A Multi-Touch Three Dimensional Touch-Sensitive Tablet", Proceedings of CHI: ACM Conference on Human Factors in Computing Systems, Apr. 1985, pp. 21-25.
Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.
Rubine, "Combining Gestures and Direct Manipulation", CHI'92, May 1992, pp. 659-660.
Westerman, "Hand Tracking, Finger Identification and Chronic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.
Karlsson et al., "The Technology of Chemical Glass Strengthening—a review", Apr. 2010, Glass Technology, European Journal of Glass Science and Technology A., vol. 51, No. 2, pp. 41-54.
Examination Report for European Patent Application No. 11749636.4, dated Apr. 16, 2014.
Notice of Preliminary Rejection for Korean Patent Application No. 10-2013-7006694, dated Jul. 21, 2014.
Notice of Final Rejection for Korean Patent Application No. 10-2013-7006694, dated May 22, 2015.
First Office Action for Chinese Patent Application No. 201180047550.3, dated Nov. 26, 2014.
Office Action for Chinese Patent Application No. 201180047550.3 dated Feb. 29, 2016.
Kingery et al., "Introduction to Ceramics" 2nd Ed. John Wiley & Sons, 1976, pp. 792 and 833-844.
Second Office Action for Chinese Patent Application No. 201180047550.3, dated Sep. 30, 2015.
Second Final Rejection for Korean Patent Application No. 10-2013-70006694, dated Sep. 16, 2015.

* cited by examiner

ENHANCED STRENGTHENING OF GLASS

CROSS-REFERENCE TO RELATED APPLICATION

This application claims priority to U.S. Provisional Patent Application No. 61/374,988, filed Aug. 18, 2010, and entitled "ENHANCED GLASS STRENGTHENING OF GLASS", which is hereby incorporated herein by reference.

BACKGROUND OF THE INVENTION

Conventionally, some portable electronic devices use glass as a part of their devices, either internal or external. Externally, a glass part can be provided as part of a housing, such a glass part is often referred to as a cover glass. The transparent and scratch-resistance characteristics of glass make it well suited for such applications. Internally, glass parts can be provided to support display technology. More particularly, for supporting a display, a portable electronic device can provide a display technology layer beneath an outer cover glass. A sensing arrangement can also be provided with or adjacent the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass.

Unfortunately, however, use of glass with portable electronic devices requires that the glass be relatively thin. Generally speaking, the thinner the glass the more susceptible the glass is to damage when the portable electronic device is stressed or placed under a significant force. Chemically strengthening has been used to strengthen glass. While chemically strengthening is effective, there is a continuing need to provide improved ways to strengthen glass, namely, thin glass.

SUMMARY

The invention relates generally to increasing the strength of glass. Through multi-bath chemical processing greater levels of strengthening can be achieved for glass articles. The multi-bath chemical processing can be achieved through the use of successive chemical baths. The use of multi-bath chemical processing for a glass article can enhance the effectiveness of the chemical strengthening process. Accordingly, glass articles that have undergone multi-bath chemical processing are able to be not only thin but also sufficiently strong and resistant to damage. The strengthened glass articles are well suited for use in consumer products, such as consumer electronic devices (e.g., portable electronic devices).

The invention can be implemented in numerous ways, including as a method, system, device, or apparatus. Several embodiments of the invention are discussed below.

As a method for strengthening a piece of glass, one embodiment can, for example, include at least obtaining a piece of glass that is to be chemically strengthened, enhancing the glass to make it more susceptible to chemical strengthening, and subsequently chemically strengthening the enhanced glass.

As a glass strengthening system for glass articles, one embodiment can, for example, includes at least a first bath station providing a sodium solution, and a second bath station providing a potassium solution. The first bath station serves to receive a glass article and to introduce sodium ions into surfaces of the glass article. The second bath station serves to receive the glass article following the first bath station and to exchange potassium ions for sodium ions within the glass article.

As a method for processing a glass piece to improve its strength, one embodiment can, for example, include at least: submerging the glass piece in a heated sodium bath, determining whether the glass piece should be removed from the heated sodium bath, subsequently submerging the glass piece in a heated potassium bath, determining whether the glass piece should be removed from the heated potassium bath, and performing post-processing on the glass piece following removal of the glass piece from the heated potassium bath.

A method for processing a glass piece to improve its strength, another embodiment can, for example, include at least: submerging the glass piece in a heated sodium bath; removing the glass piece from the heated sodium bath after being in the heated sodium solution for a first duration; subsequently submerging the glass piece in a heated potassium bath; removing the glass piece from the heated potassium bath after being in the heated potassium solution for a second duration; and performing post-processing on the glass piece following removal of the glass piece from the heated potassium bath.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention relates generally to increasing the strength of glass. Through multi-bath chemical processing greater levels of strengthening can be achieved for glass articles. The multi-bath chemical processing can be achieved through the use of successive chemical baths. The use of multi-bath chemical processing for a glass article can enhance the effectiveness of the chemical strengthening process. Accordingly, glass articles that have undergone multi-bath chemical processing are able to be not only thin but also sufficiently strong and resistant to damage. The strengthened glass articles are well suited for use in consumer products, such as consumer electronic devices (e.g., portable electronic devices).

Embodiments of the invention can relate to apparatus, systems and methods for improving strength of a thin glass member for a consumer product, such as a consumer electronic device. In one embodiment, the glass member may be an outer surface of a consumer electronic device. For example, the glass member may, for example, correspond to a glass cover that helps form part of a display area of the electronic device (i.e., situated in front of a display either as a separate part or integrated within the display). As another example, the glass member may form a part of a housing for the consumer electronic device (e.g., may form an outer surface other than in the display area). In another embodiment, the glass member may be an inner component of a consumer electronic device. For example, the glass member can be a component glass piece of a LCD display provided internal to the housing of the consumer electronic device.

The apparatus, systems and methods for improving strength of thin glass are especially suitable for glass covers or displays (e.g., LCD displays), particularly those assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.3 and 2.5 mm. The apparatus, systems and methods can also be used for glass covers or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.3 and 3 mm.

Embodiments of the invention are discussed below with reference to FIGS. 1-10. However, those skilled in the art will readily appreciate that the detailed description given herein with respect to these figures is for explanatory purposes as the invention extends beyond these limited embodiments. The illustrations provided in these figures are not necessarily drawn to scale; instead, the illustrations are presented in a manner to facilitate presentation.

Figure 1:
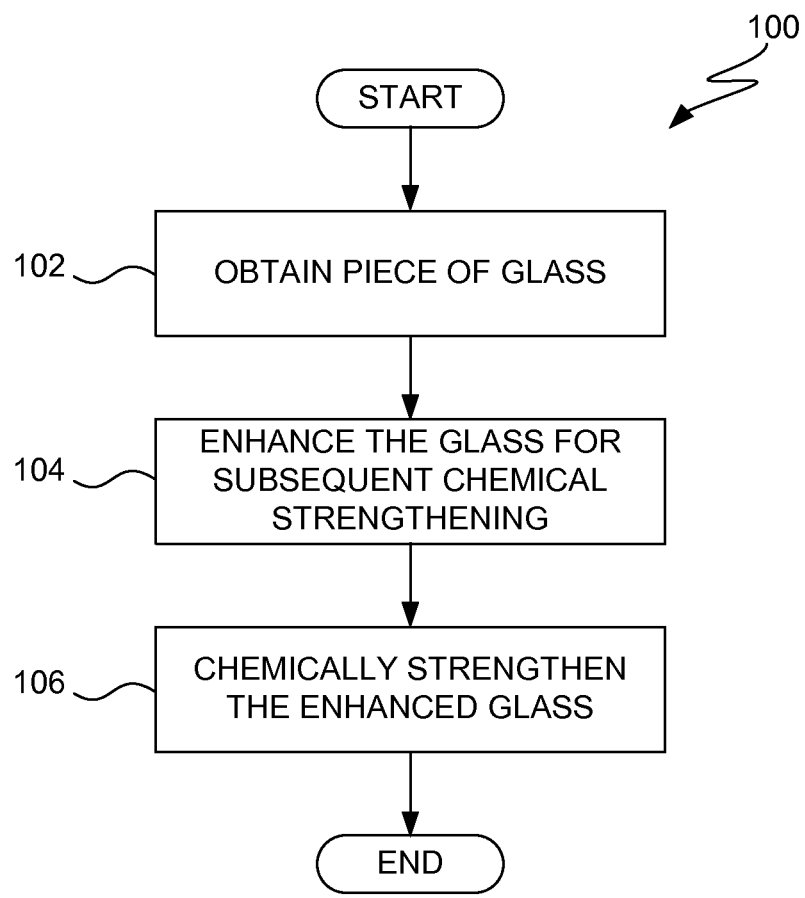
FIG. 1 is a flow diagram of a glass strengthening process according to one embodiment.

FIG. 1 is a flow diagram of a glass strengthening process 100 according to one embodiment. The glass strengthening process 100 serves to chemically strengthen a piece of glass such that it is better suited for its particular usage.

The glass strengthening process 100 can enhance 104 the glass for subsequent chemical strengthening. In one implementation, the glass can be enhanced 104 chemically through chemical processing. Specifically, the glass can be placed in a sodium solution so that sodium ions can migrate from the sodium solution into the glass, namely into the exposed surfaces of the glass.

After the glass has been enhanced 104, the enhanced glass can be chemically strengthened 106. In one implementation, the enhanced glass can be chemically strengthened 106 through chemical processing. Specifically, the enhanced glass can be placed in a potassium solution so that potassium ions from the potassium solution can be exchanged for sodium ions within the enhanced glass.

By enhancing 104 the glass, the glass becomes more susceptible to chemical strengthening 106. In other words, the glass can be strengthened to a greater extent when the glass has been enhanced 104. Following block 106, the piece of glass has been chemically strengthened. Due to the enhancement of the glass, the glass is able to be chemically strengthened to a greater extent. Following the chemical strengthening, the glass strengthening process 100 can end.

Figure 2:
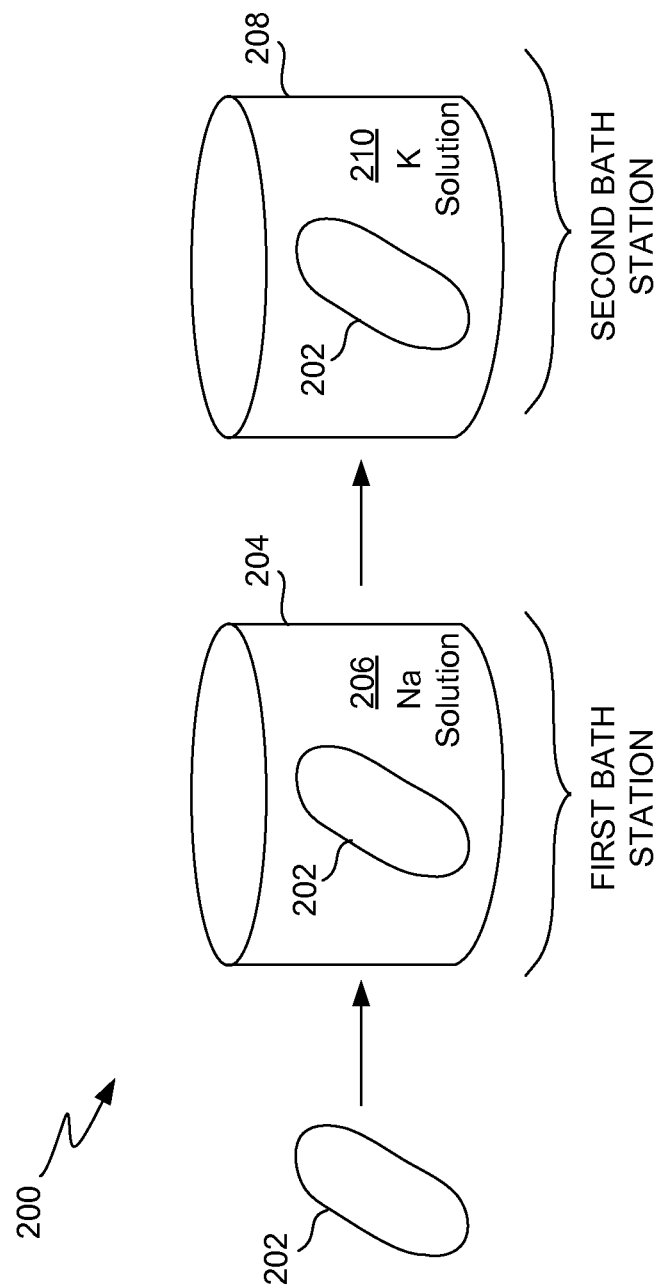
FIG. 2 illustrates a glass strengthening system according to one embodiment.

FIG. 2 illustrates a glass strengthening system 200 according to one embodiment. The glass strengthening system 200 receives a glass article 202 to be strengthened through chemical processing. The glass article 202 is provided to a first bath station in which a first bath 204 is provided. The glass article 202 can be inserted (e.g., immersed) into the first bath 204 which includes a sodium solution 206. Next, the glass article 202 is removed from the first bath station and provided to a second bath station. The second bath station provides a second bath 208. The glass article can be inserted (e.g., immersed) into the second bath 208 which includes a potassium solution 210. Later, the glass article 202 is removed from the second bath 208. At this point, the glass article has been first enhanced and then strengthened. Since the glass article was enhanced, the glass article is able to be chemically strengthened to a greater extent than would otherwise have been determined if the glass article were not first enhanced.

Furthermore, following removal of the glass article from the second bath 208, post-processing can be performed on the glass article. Post-processing can vary widely dependent on intended application for the glass article. However, post-processing can, for example, include one or more of rinsing, polishing, annealing and the like.

The sodium solution 206 within the first bath 204 can be heated to a predetermined temperature, and the glass article 202 can be immersed within the first bath 204 for a predetermined period of time. The degree of enhancement of the glass article 202 is dependent on: (1) type of glass, (2) concentration of bath (e.g., Na concentration), (3) time in the first bath 204, and (4) temperature of the first bath 204. Likewise, the potassium solution 210 within the second bath 208 can be heated to a predetermined temperature, and the glass article 202 can be immersed within the second bath 208 for a predetermined period of time. The degree of chemically strengthening provided by the second bath 208 to the glass article is dependent on: (1) type of glass, (2) concentration of bath (e.g., K concentration), (3) time in the second bath 208, and (4) temperature of the second bath 208.

In one implementation, the glass for the glass article can, for example, be alumina silicate glass or soda lime glass. Also, glass from different suppliers, even if the same type of glass, can have different properties and thus may require different values. The first bath 204 can be a sodium (Na) bath or a sodium nitrate (NaNO3) bath, in either case with a sodium concentration of 30%-100% mol. In another embodiment the first bath 204 can be a sodium nitrate (NaNO3) and potassium nitrate (KNO3) bath. The time for the glass article 202 to remain immersed in the first bath 204 can be about 4-8 hours and the temperature for the first bath 204 can be about 350-450 degrees Celsius. The time for the glass article 202 to remain immersed in the second bath 208 can be about 6-20 hours and the temperature for the second bath 208 can be about 300-500 degrees Celsius.

Figure 3:
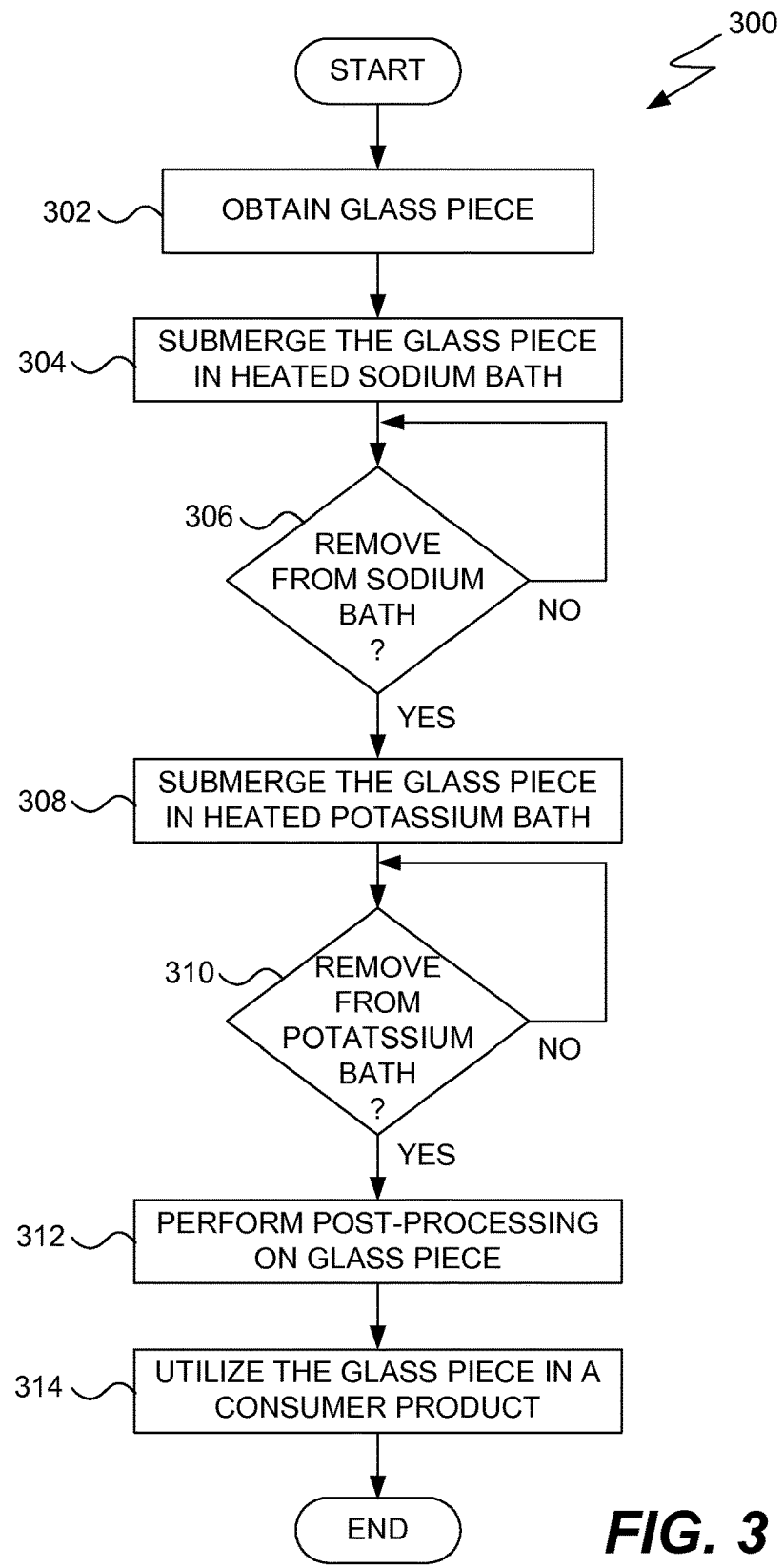
FIG. 3 is a flow diagram of a glass piece process according to one embodiment.

FIG. 3 is a flow diagram of a glass piece process 300 according to one embodiment. The glass piece process 300 serves to process a piece of glass such that is more suitable for subsequent use in a consumer product.

The glass piece process 300 initially obtains 302 a piece of glass. The glass piece can be submerged 304 in a heated sodium bath. A decision 306 can then determine whether the glass piece should be removed from the heated sodium bath. For example, the heated sodium bath can be maintained at a predetermined temperature and the glass piece can be submerged within the heated sodium for a predetermined period of time. As an example, the decision 306 can determine that the glass piece should be removed from the heated sodium bath after the glass piece has been immersed in the heated sodium bath for the predetermined amount of time.

Once the decision 306 determines that the glass piece is to be removed from the heated sodium bath, the glass piece can then be submerged 308 into a heated potassium bath. A decision 310 can then determine whether the glass piece should be removed from the heated potassium bath. The heated potassium bath can, for example, be maintained at a predetermined temperature and the glass piece can be submerged within the heated potassium bath for a predetermined period of time.

Once the decision 310 determines that the glass piece is to be removed from the potassium bath, post-processing on the glass piece can be performed 312. The post-processing can vary depending upon application. For example, the post-processing can include one or more of: polishing, grinding, heating, annealing, cleaning and the like for the glass piece. Typically, the post-processing is performed on the glass piece to make the glass piece more suitable for its intended usage.

Following the performing 312 of the post-processing, the glass piece can be utilized 314 in a consumer product. The glass piece can be used as an outer portion of a housing for the consumer product, or can be used as an internal component (e.g., LCD glass panel) glass piece. For example, the consumer product can be a consumer electronics product, such as a portable electronic device. Following the block 314, the glass piece process 300 can end.

The predetermined temperature for use with the heated potassium bath can be the same or different than the predetermined temperature for use with the heated sodium bath. The predetermined period of time for use with the heated potassium bath can be the same or different than the predetermined period of time for use with the heated sodium bath. For example, the glass piece can be immersed in a heated sodium bath at a temperature of about 350-450 degrees Celsius for a predetermined amount of time of about 4-8 hours. Also, for example, the glass piece can be immersed in a heated potassium bath at a temperature of about 300-500 degrees Celsius for a predetermined amount of time of about 6-20 hours.

According to another embodiment, glass processing can further include an additional bath. The additional bath can be provided to provide a small amount of back exchange of ions at the surfaces of a glass piece (glass article). The back exchange can serve to exchange potassium ions from the glass piece for sodium ions. This back exchange process can be useful to move a compressive maximum inward from the outer edges (10-70 micrometers) as defects or cracks proximate the edges reside slightly inward from the edges and are weak points that render the glass piece more susceptible to causing damage to the glass member.

Figure 4:
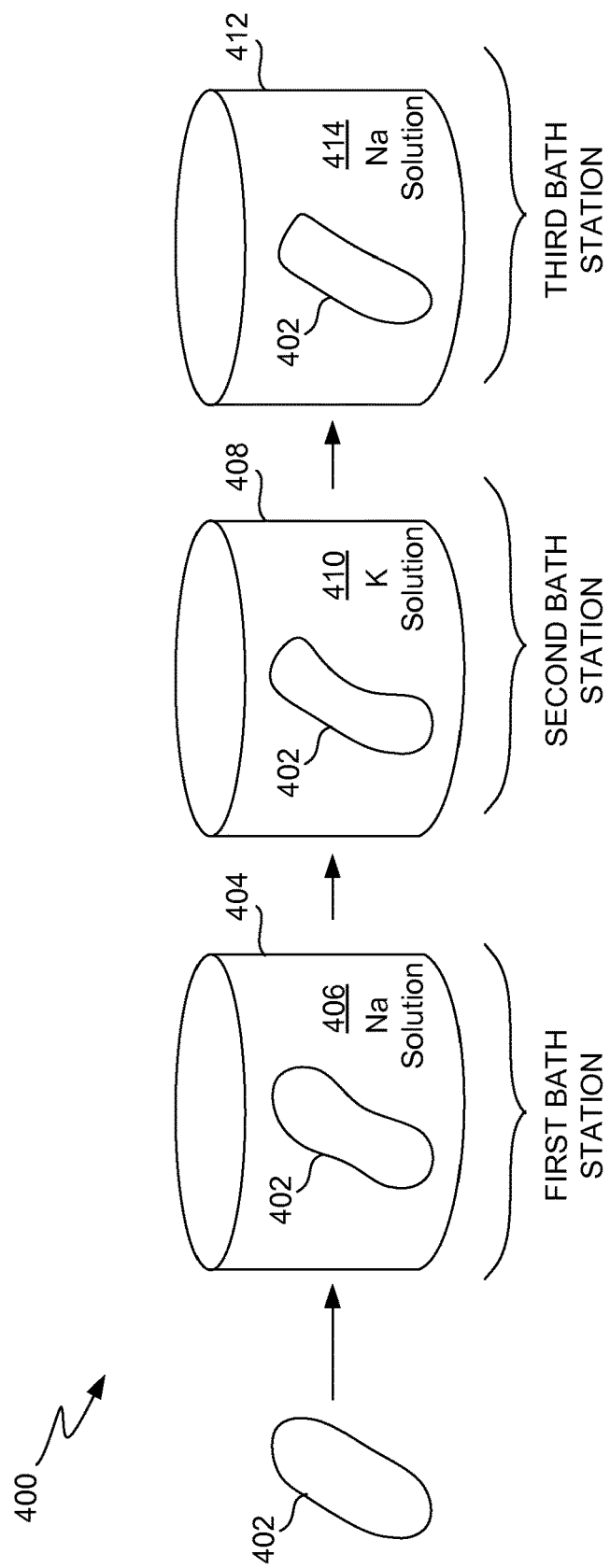
FIG. 4 illustrates a glass strengthening system according to another embodiment.

FIG. 4 illustrates a glass strengthening system 400 according to another embodiment. The glass strengthening system 400 receives a glass article 402 to be strengthened through chemical processing. The glass article 402 is provided to a first bath station where a first bath 404 is provided. The glass article 402 can be inserted (e.g., immersed) into the first bath 404 which includes a sodium solution 406. Next, the glass article 402 is removed from the first bath station and provided to a second bath station. The second bath station provides a second bath 408. The glass article can be inserted (e.g., immersed) into the second bath 408 which includes a potassium solution 410. Later, the glass article 402 is removed from the second bath 408. At this point, the glass article has been first enhanced and then strengthened. Since the glass article was enhanced, the glass article is able to be chemically strengthened to a greater extent.

Additionally, after the glass article 402 has been removed from the second bath 408, the glass article can be provided to a third bath station where a third bath 412 is provided. The glass article 402 can be inserted (e.g., immersed) into the third bath 412 which includes a sodium solution 414. Here, potassium ions from the glass article exchange with sodium ions in the sodium solution. This can be referred to as a back exchange because some ions previously exchanged with the glass article are effectively unexchanged or returned. Subsequently, the glass article 402 is removed from the third bath 412.

The sodium solution 406 within the first bath 404 can be heated to a predetermined temperature, and the glass article 402 can be immersed within the first bath 404 for a predetermined period of time. The degree of enhancement of the glass article is dependent on at least: (1) type of glass, (2) concentration of bath (e.g., Na concentration), (3) time in the first bath 402, and (4) temperature of the first bath 402. Likewise, the potassium solution 410 within the second bath 408 can heated to a predetermined temperature, and the glass article 402 can be immersed within the second bath 408 for a predetermined period of time. Still further, the sodium solution 414 within the third bath 412 can heated to a predetermined temperature, and the glass article 402 can be immersed within the third bath 412 for a predetermined period of time.

The predetermined period of time for use with the second bath 408 can be the same or different than the predetermined period of time for use with the first bath 404 or the third bath 412. The predetermined period of time for use with the third bath 412 can be the same or different than the predetermined period of time for use with the first bath 404 or the second bath 408. Typically, the predetermined period of time for use with the third bath 412 is substantially less than the predetermined period of time for use with the first bath 404.

Furthermore, following removal of the glass article from the third bath 412, post-processing can be performed on the glass article. Post-processing can vary widely dependent on intended application for the glass article. However, post-processing can, for example, include one or more of rinsing, polishing, annealing and the like.

The sodium solution 406 within the first bath 404 can be heated to a predetermined temperature, and the glass article 402 can be immersed within the first bath 404 for a predetermined period of time. The degree of enhancement of the glass article 402 is dependent on: (1) type of glass, (2) concentration of bath (e.g., Na concentration), (3) time in the first bath 404, and (4) temperature of the first bath 404. Likewise, the potassium solution 410 within the second bath 408 can heated to a predetermined temperature, and the glass article 402 can be immersed within the second bath 408 for a predetermined period of time. The degree of chemically strengthening provided by the second bath 408 to the glass article is dependent on: (1) type of glass, (2) concentration of bath (e.g., K concentration), (3) time in the second bath 408, and (4) temperature of the second bath 408.

In one implementation, the glass for the glass article can, for example, be alumina silicate glass or soda lime glass. Also, glass from different suppliers, even if the same type of glass, can have different properties and thus may require different values. The first bath 404 can be a sodium (Na) bath or a sodium nitrate (NaNO3) bath, in either case with a sodium concentration of 30%-100% mol. The time for the glass article 402 to remain immersed in the first bath 404 can be about 4-8 hours and the temperature for the first bath 404 can be about 350-450 degrees Celsius. The time for the glass article 402 to remain immersed in the second bath 408 can be about 6-20 hours and the temperature for the second bath 408 can be about 300-500 degrees Celsius. The third bath 412 can be a sodium (Na) bath or a sodium nitrate (NaNO3) bath, in either case with a sodium concentration of 30%-100% mol. The time for the glass article 402 to remain immersed in the third bath 412 can be about 1-30 minutes and the temperature for the third bath 412 can be about 350-450 degrees Celsius.

Figure 5:
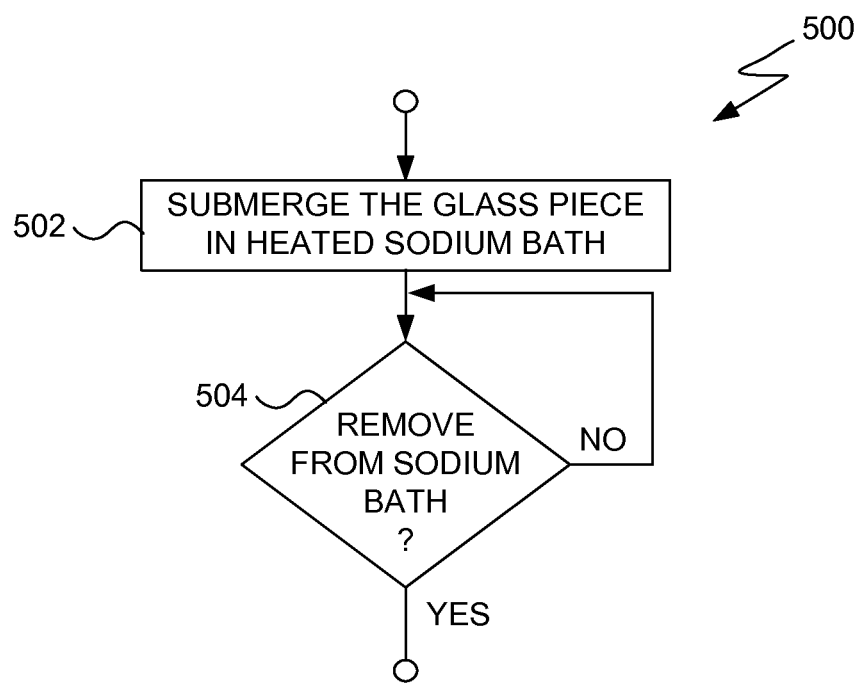
FIG. 5 is a flow diagram of a back exchange process according to one embodiment.

FIG. 5 is a flow diagram of a back exchange process 500 according to one embodiment. The back exchange process 500 provides additional, optional processing that can be used with the glass piece process 300 illustrated in FIG. 3. For example, the back exchange process 500 can be optionally used following block 310 and prior to block 312 of the glass piece process 300.

The back exchange process 500 provides an additional bath for providing back exchange of sodium into the glass piece. According to the back exchange process 500, the glass piece can be submerged 502 into a heated sodium bath. A decision 504 can then determine whether the glass piece should be removed from the heated sodium bath. For example, the heated sodium bath can be maintained at a predetermined temperature and the glass piece can be submerged within the heated sodium bath for a predetermined period of time. As an example, the decision 504 can determine that the glass piece should be removed from the heated sodium bath after the glass piece has been immersed in the heated sodium bath for the predetermined amount of time.

Once the decision 504 determines that the glass piece is to be removed from the heated sodium bath, the processing of the glass piece can then return to perform pre-processing at block 312 and subsequent operations of the glass piece process 300 illustrated in FIG. 3.

In the back exchange process 500, the heated sodium bath can be heated to a predetermined temperature, and the glass piece can be immersed within the heated sodium bath for a predetermined period of time. The extent of the back exchange fir the glass piece can be dependent on: (1) type of glass, (2) concentration of bath (e.g., Na concentration), (3) time in the sodium bath, and (4) temperature of the sodium bath. In one implementation, the glass for the glass piece can, for example, be alumina silicate glass or soda lime glass. Also, glass from different suppliers, even if the same type of glass, can have different properties and thus may require different values. The heated sodium bath can be a sodium (Na) bath or a sodium nitrate (NaNO3) bath, in either case with a sodium concentration of 30%-100% mol. The predetermined period of time for the glass piece to remain immersed in the heated sodium bath for back exchange can be about 1-30 minutes and the temperature for the heated sodium bath can be about 350-450 degrees Celsius.

As previously discussed, glass covers can be used as an outer surface of portions of a housing for electronic devices, such as portable electronic devices. Those portable electronic devices that are small and highly portable can be referred to as handheld electronic devices. A handheld electronic device may, for example, function as a media player, phone, internet browser, email unit or some combination of two or more of such. A handheld electronic device generally includes a housing and a display area.

Figure 6A:
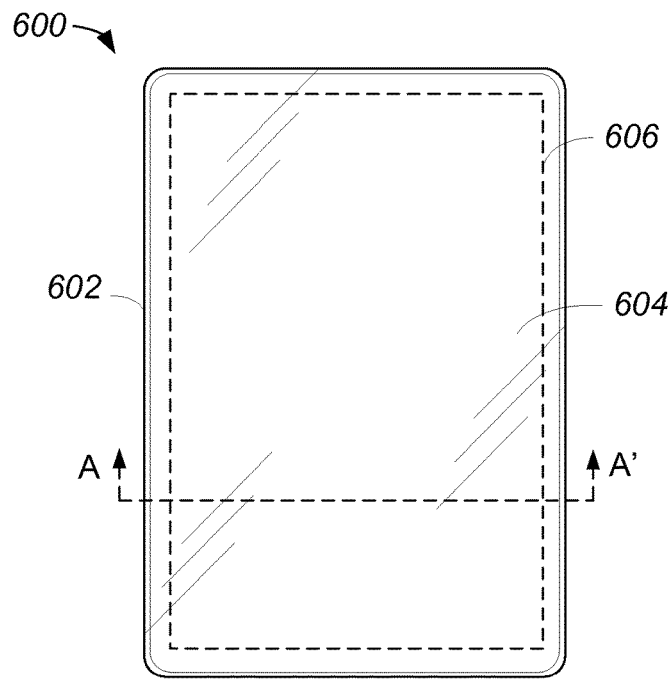
FIGS. 6A and 6B are diagrammatic representations of electronic device according to one embodiment.
Figure 6B:
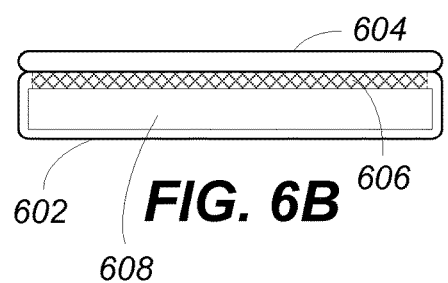

FIGS. 6A and 6B are diagrammatic representations of electronic device 600 according to one embodiment. FIG. 6A illustrates a top view for the electronic device 600, and FIG. 6B illustrates a cross-sectional side view for electronic device 600 with respect to reference line A-A'. Electronic device 600 can include housing 602 that has glass cover window 604 (glass cover) as a top surface. Cover window 604 is primarily transparent so that display assembly 606 is visible through cover window 604. Cover window 604 can be chemically strengthened using the multi-bath chemical processing described herein. Display assembly 606 can, for example, be positioned adjacent cover window 604. Housing 602 can also contain internal electrical components besides the display assembly, such as a controller (processor), memory, communications circuitry, etc. Display assembly 606 can, for example, include a LCD module. By way of example, display assembly 606 may include a Liquid Crystal Display (LCD) that includes a Liquid Crystal Module (LCM). In one embodiment, cover window 604 can be integrally formed with the LCM. Housing 602 can also include an opening 608 for containing the internal electrical components to provide electronic device 600 with electronic capabilities. In one embodiment, housing 602 may need not include a bezel for cover window 604. Instead, cover window 604 can extend across the top surface of housing 602 such that the edges of cover window 604 can be aligned (or substantially aligned) with the sides of housing 602. The edges of cover window 604 can remain exposed. Although the edges of cover window 604 can be exposed as shown in FIGS. 6A and 6B, in alternative embodiment, the edges can be further protected. As one example, the edges of cover window 604 can be recessed (horizontally or vertically) from the outer sides of housing 602. As another example, the edges of cover window 604 can be protected by additional material placed around or adjacent the edges of cover window 604.

Cover window 604 may generally be arranged or embodied in a variety of ways. By way of example, cover window 604 may be configured as a protective glass piece that is positioned over an underlying display (e.g., display assembly 606) such as a flat panel display (e.g., LCD) or touch screen display (e.g., LCD and a touch layer). Alternatively, cover window 604 may effectively be integrated with a display, i.e., glass window may be formed as at least a portion of a display. Additionally, cover window 604 may be substantially integrated with a touch sensing device such as a touch layer associated with a touch screen. In some cases, cover window 604 can serve as the outer most layer of the display.

Figure 7A:
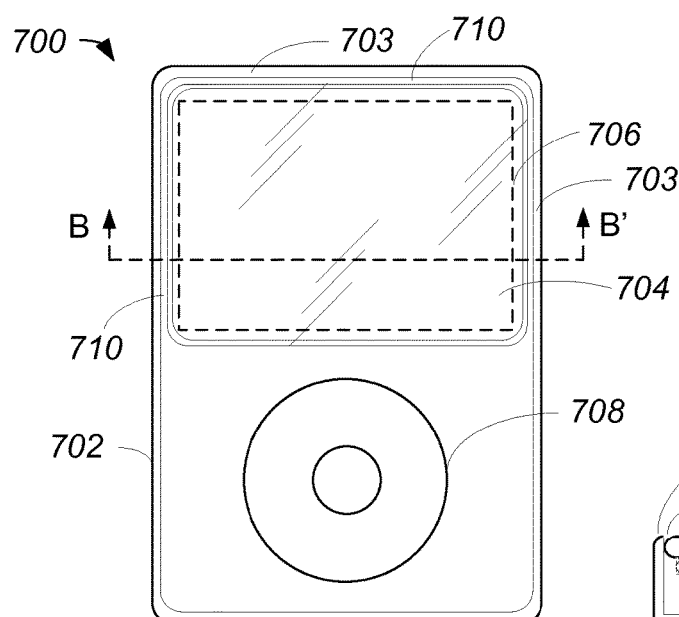
FIGS. 7A and 7B are a diagrammatic representation of an electronic device according to another embodiment.
Figure 7B:
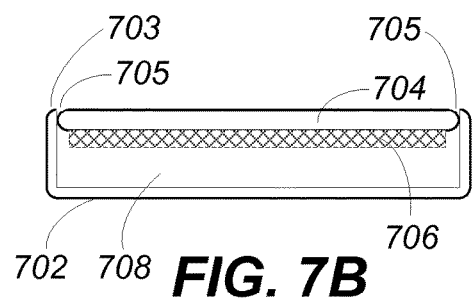

FIGS. 7A and 7B are diagrammatic representations of electronic device 700 according to another embodiment of the invention. FIG. 7A illustrates a top view for electronic device 700, and FIG. 7B illustrates a cross-sectional side view for electronic device 700 with respect to reference line B-B'. Electronic device 700 can include housing 702 that has glass cover window 704 (glass cover) as a top surface. In this embodiment, cover window 704 can be protected by side surfaces 703 of housing 702. Here, cover window 704 does not fully extend across the top surface of housing 702; however, the top surface of side surfaces 703 can be adjacent to and aligned vertically with the outer surface of cover window 704. Since the edges of cover window 704 can be rounded for enhanced strength, there may be gaps 705 that are present between side surfaces 703 and the peripheral edges of cover window 704. Gaps 705 are typically very small given that the thickness of cover window 704 is thin (e.g., less than 3 mm). However, if desired, gaps 705 can be filled by a material. The material can be plastic, rubber, metal, etc. The material can conform in gap 705 to render the entire front surface of electronic device 700 flush, even across gaps 705 proximate the peripheral edges of cover window 704. The material filling gaps 705 can be compliant. The material placed in gaps 705 can implement a gasket. By filling the gaps 705, otherwise probably undesired gaps in the housing 702 can be filled or sealed to prevent contamination (e.g., dirt, water) forming in the gaps 705. Although side surfaces 703 can be integral with housing 702, side surface 703 could alternatively be separate from housing 702 and, for example, operate as a bezel for cover window 704.

Cover window 704 is primarily transparent so that display assembly 706 is visible through cover window 704. Display assembly 706 can, for example, be positioned adjacent cover window 704. Housing 702 can also contain internal electrical components besides the display assembly, such as a controller (processor), memory, communications circuitry, etc. Display assembly 706 can, for example, include a LCD module. By way of example, display assembly 706 may include a Liquid Crystal Display (LCD) that includes a Liquid Crystal Module (LCM). In one embodiment, cover window 704 is integrally formed with the LCM. Housing 702 can also include an opening 708 for containing the internal electrical components to provide electronic device 700 with electronic capabilities.

The front surface of electronic device 700 can also include user interface control 708 (e.g., click wheel control). In this embodiment, cover window 704 does not cover the entire front surface of electronic device 700. Electronic device 700 essentially includes a partial display area that covers a portion of the front surface.

Cover window 704 may generally be arranged or embodied in a variety of ways. By way of example, cover window 704 may be configured as a protective glass piece that is positioned over an underlying display (e.g., display assembly 706) such as a flat panel display (e.g., LCD) or touch screen display (e.g., LCD and a touch layer). Alternatively, cover window 704 may effectively be integrated with a display, i.e., glass window may be formed as at least a portion of a display. Additionally, cover window 704 may be substantially integrated with a touch sensing device such as a touch layer associated with a touch screen. In some cases, cover window 704 can serve as the outer most layer of the display.

As noted above, the electronic device can be a handheld electronic device or a portable electronic device. The invention can serve to enable a glass cover to be not only thin but also adequately strong. Since handheld electronic devices and portable electronic devices are mobile, they are potentially subjected to various different impact events and stresses that stationary devices are not subjected to. As such, the invention is well suited for implementation of glass surfaces for handheld electronic device or a portable electronic device that are designed to be thin.

The strengthened glass, e.g., glass covers or cover windows, is particularly useful for thin glass applications. For example, the thickness of a glass cover being strengthen can be between about 0.5-2.5 mm. In other embodiments, the strengthening is suitable for glass products whose thickness is less than about 2 mm, or even thinner than about 1 mm, or still even thinner than about 0.6 mm.

Chemically strengthening glass, e.g., glass covers or cover windows, can be more effective for edges of glass that are rounded by a predetermined edge geometry having a predetermined curvature (or edge radius) of at least 10% of the thickness applied to the corners of the edges of the glass. In other embodiments, the predetermined curvature can be between 20% to 50% of the thickness of the glass. A predetermined curvature of 50% can also be considered a continuous curvature, one example of which is illustrated in FIG. 3E.

In one embodiment, the size of the glass cover depends on the size of the associated electronic device. For example, with handheld electronic devices, the size of the glass cover is often not more than five (5) inches (about 12.7 cm) diagonal. As another example, for portable electronic devices, such as smaller portable computers or tablet computers, the size of the glass cover is often between four (4) (about 10.2 cm) to twelve (12) inches (about 30.5 cm) diagonal. As still another example, for portable electronic devices, such as full size portable computers, displays (including televisions) or monitors, the size of the glass cover is often between ten (10) (about 25.4 cm) to twenty (20) inches (about 50.8 cm) diagonal or even larger.

However, it should be appreciated that with larger screen sizes, the thickness of the glass layers may need to be greater. The thickness of the glass layers may need to be increased to maintain planarity of the larger glass layers. While the displays can still remain relatively thin, the minimum thickness can increase with increasing screen size. For example, the minimum thickness of the glass cover can correspond to about 0.3 mm for small handheld electronic devices, about 0.5 mm for smaller portable computers or tablet computers, about 1.0 mm or more for full size portable computers, displays or monitors, again depending on the size of the screen. However, more generally, the thickness of the glass cover can depend on the application and/or the size of electronic device.

As discussed above, glass cover or, more generally, a glass piece may be chemically treated such that surfaces of the glass are effectively strengthened. Through such strengthening, glass pieces can be made stronger so that thinner glass pieces can be used with consumer electronic device. Thinner glass with sufficient strength allows for consumer electronic device to become thinner.

Figure 8:
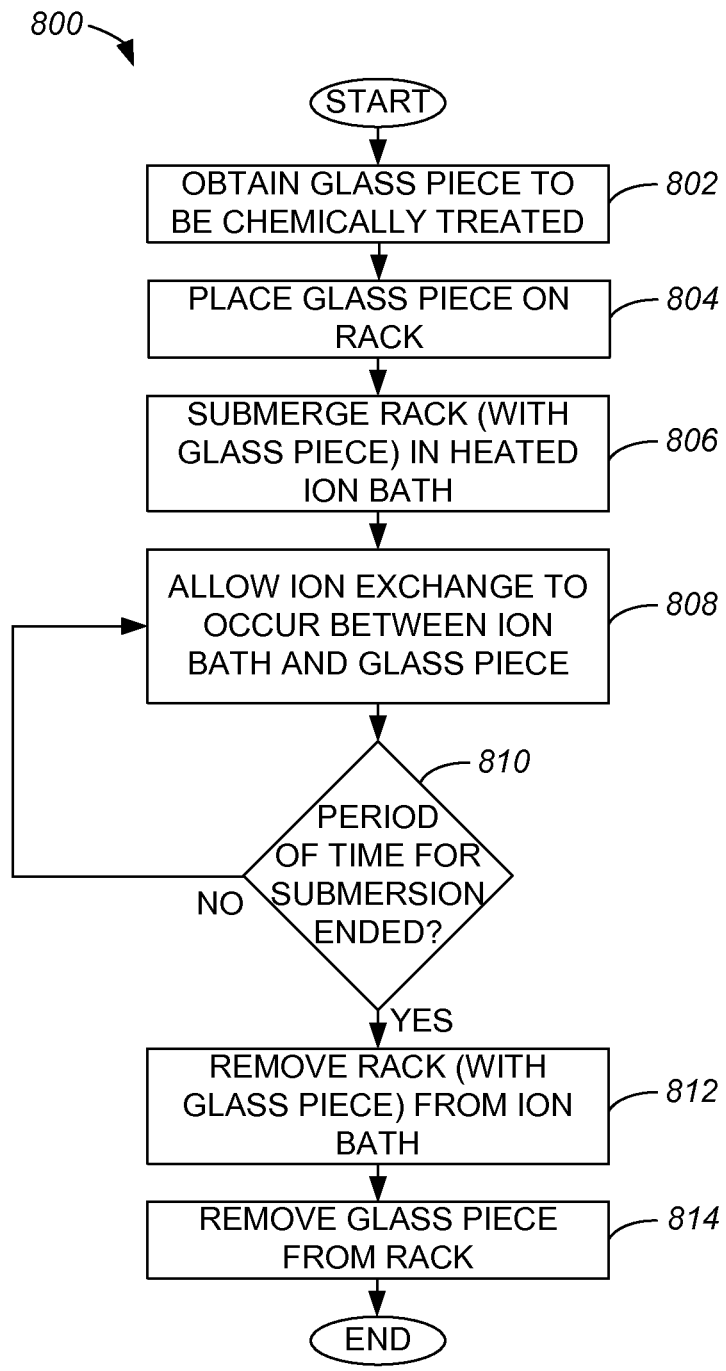
FIG. 8 is flow diagram which illustrates a method of chemically strengthening glass, e.g., a glass cover, according to one embodiment.

FIG. 8 illustrates a process 800 of chemically treating surfaces of a glass piece in accordance with one embodiment. The process 800 can represent processing associated with chemical strengthening at a second bath station or a potassium bath as discussed above, according to one embodiment. The process 800 of chemically treating surfaces, e.g., edges, of a glass piece can begin at step 802 in which the glass piece is obtained. The glass piece may be obtained, in one embodiment, after a glass sheet is singulated into glass pieces, e.g., glass covers, and the edges of the glass pieces are manipulated to have a predetermined geometry. It should be appreciated, however, that a glass piece that is to be chemically treated may be obtained from any suitable source.

In step 804, the glass piece can be placed on a rack. The rack is typically configured to support the glass piece, as well as other glass pieces, during chemical treatment. Once the glass piece is placed on the rack, the rack can be submerged in a heated ion bath in step 806. The heated ion bath may generally be a bath which includes a concentration of ions (e.g., Alkali metal ions, such as Lithium, Cesium or Potassium). It should be appreciated that the concentration of ions in the bath may vary, as varying the concentration of ions allows compression stresses on surfaces of the glass to be controlled. The heated ion bath may be heated to any suitable temperature to facilitate ion exchange.

After the rack is submerged in the heated ion bath, an ion exchange is allowed to occur in step 808 between the ion bath and the glass piece held on the rack. A diffusion exchange occurs between the glass piece, which generally includes $Na^+$ ions, and the ion bath. During the diffusion exchange, Alkali metal ions, which are larger than $Na^+$ ions, effectively replace the $Na^+$ ions in the glass piece. In general, the $Na^+$ ions near surface areas of the glass piece may be replaced by the Alkali ions, while $Na^+$ ions are essentially not replaced by Alkali ions in portions of the glass which are not surface areas. As a result of the Alkali ions replacing $Na^+$ ions in the glass piece, a compressive layer is effectively generated near the surface of the glass piece. The $Na^+$ ions which have been displaced from the glass piece by the Alkali metal ions become a part of the ion solution.

A determination can be made in step 810 as to whether a period of time for submerging the rack in the heated ion bath has ended. It should be appreciated that the amount of time that a rack is to be submerged may vary widely depending on implementation. Typically, the longer a rack is submerged, i.e., the higher the exchange time for Alkali metal ions and $Na^+$ ions, the deeper the depth of the chemically strengthened layer. For example, with thickness of the glass sheet being on the order of 1 mm, the chemical processing (i.e., ion exchange) provided in the ion bath can be provide into the surfaces of the glass pieces 10 micrometers or more. For example, if the glass pieces are formed from soda lime glass, the depth of the compression layer due to the ion exchange can be about 10 microns. As another example, if the glass pieces are formed from alumino silicate glass, the depth of the compression layer due to the ion exchange can be about 50 microns.

If the determination in step 810 is that the period of time for submerging the rack in the heated ion bath has not ended, then process 800 flow can return to step 817 in which the chemical reaction is allowed to continue to occur between the ion bath and the glass piece. Alternatively, if it is determined that the period of time for submersion has ended, then the rack can be removed from the ion bath in step 812. Upon removing the rack from the ion bath, the glass piece may be removed from the rack in step 814, and the process 800 of chemically treating surfaces of a glass piece can be completed. However, if desired, the glass piece can be polished. Polishing can, for example, remove any haze or residue on the glass piece following the chemical treatment.

Figure 9A:
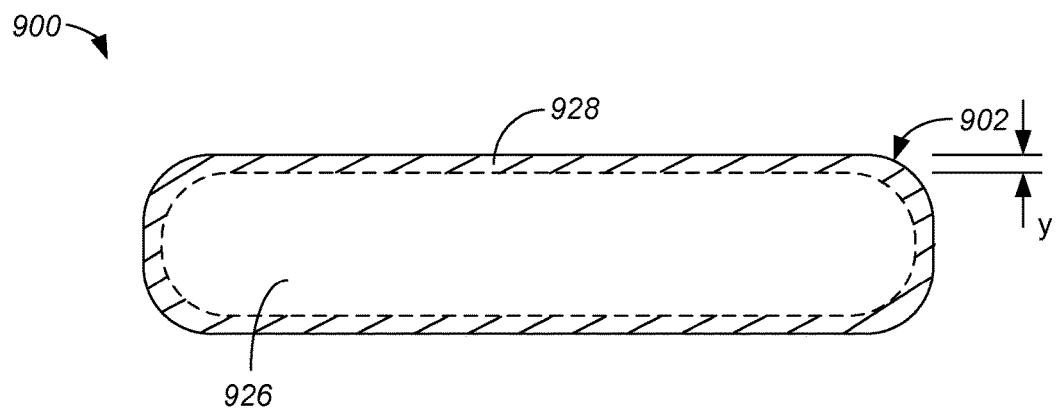
FIG. 9A is a cross-sectional diagram of a glass cover which has been chemically treated according to one embodiment.
Figure 9B:
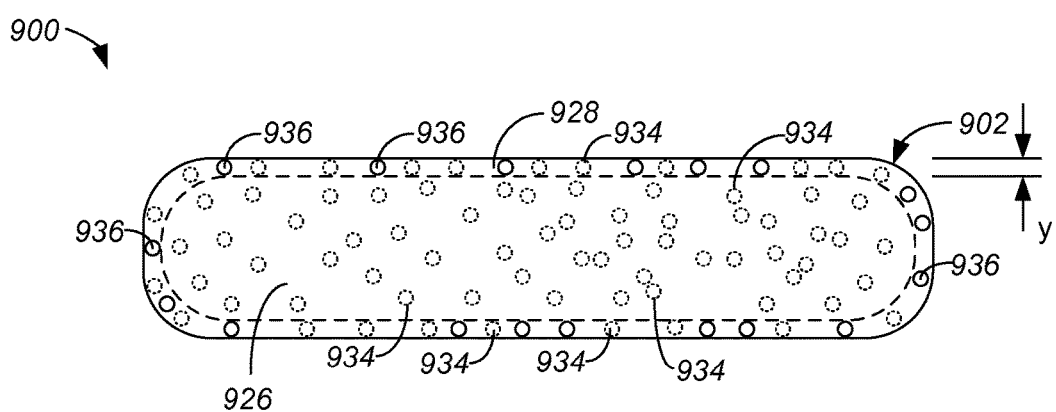
FIG. 9B is a cross-sectional diagram of a glass cover which has been chemically treated, as shown to include a chemically treated portion in which potassium ions have been implanted according to one embodiment.

A glass cover which has undergone a chemical strengthening process generally includes a chemically strengthened layer, as previously mentioned. FIG. 9A is a cross-sectional diagram of a glass cover which has been chemically treated such that a chemically strengthened layer is created according to one embodiment. A glass cover 900 includes a chemically strengthened layer 928 and a non-chemically strengthened portion 926. Although the glass cover 900 is, in one embodiment, subjected to chemical strengthening as a whole, the outer surfaces receive the strengthening. The effect of the strengthening is that the non-chemically strengthened portion 926 is in tension, while the chemically strengthened layer 928 is in compression. While glass cover 900 is shown as having a rounded edge geometry 902, it should be appreciated that glass cover 900 may generally have any edge geometry, though rounded geometries at edges may allow for increased strengthening of the edges of glass cover 900. Rounded edge geometry 902 is depicted by way of example, and not for purposes of limitation.

Chemically strengthened layer 928 has a thickness (y) which may vary depending upon the requirements of a particular system in which glass cover 900 is to be utilized. Non-chemically strengthened portion 926 generally includes $Na^+$ ions 934 but no Alkali metal ions 936. A chemical strengthening process causes chemically strengthened layer 928 to be formed such that chemically strengthened layer 928 includes both $Na^+$ ions 934 and Alkali metal ions 936.

Figure 10:
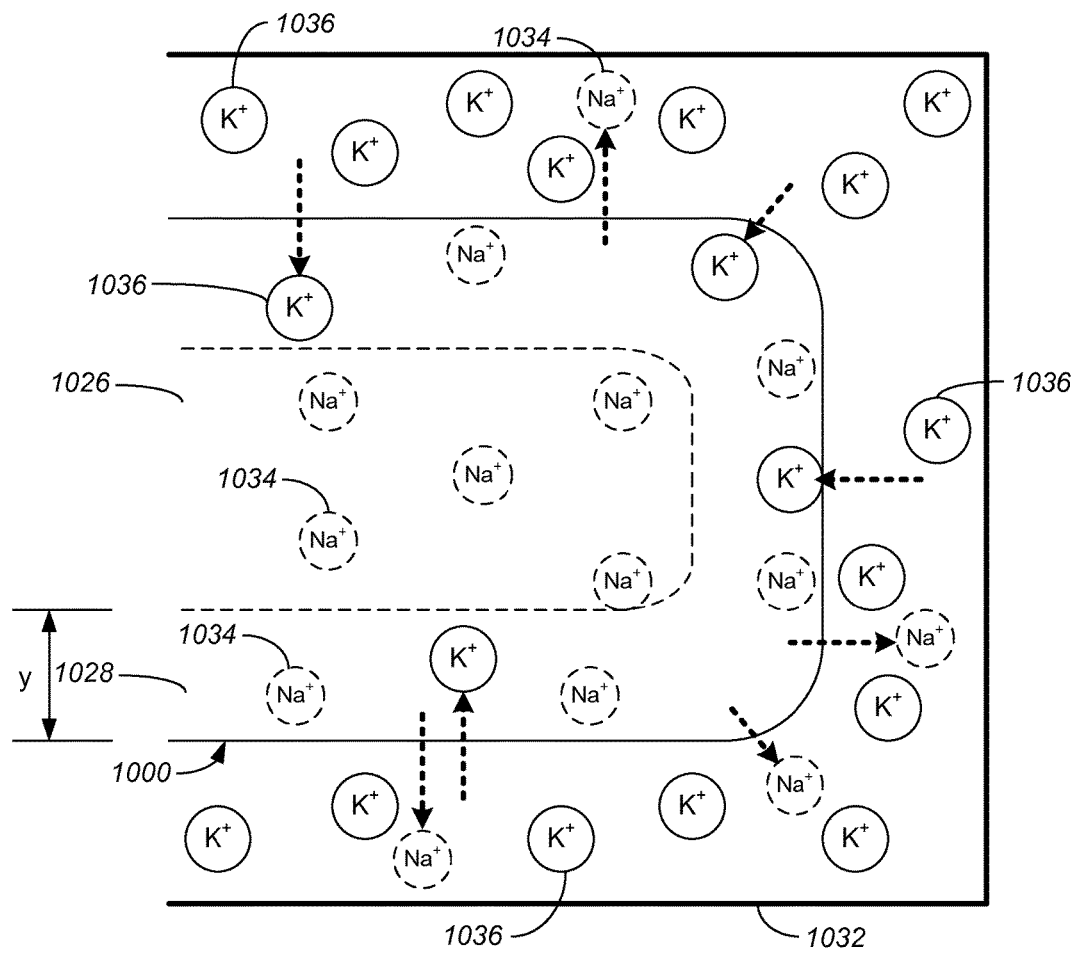
FIG. 10 is a diagrammatic representation of a chemical treatment process that involves submerging a glass cover in an ion bath according to one embodiment.

FIG. 10 is a diagrammatic representation of a chemical treatment process that involves submerging a glass cover in an ion bath according to one embodiment. When glass cover 1000, which is partially shown in cross-section, is submerged or soaked in a heated ion bath 1032, diffusion occurs. As shown, Alkali metal ions 1034 which are present in glass cover 1000 diffuse into ion bath 1032 while Alkali metal ions 1036 (e.g., potassium (K)) in ion bath 1032 diffuse into glass cover 1000, such that a chemically strengthened layer 1028 is formed. In other words, Alkali metal ions 1036 from ion bath 1032 can be exchanged with $Na^+$ ions 1034 to form chemically strengthened layer 1028. Alkali metal ions 1036 typically would not diffuse into a center portion 1026 of glass cover 1000. By controlling the duration (i.e., time) of a chemical strengthening treatment, temperature and/or the concentration of Alkali metal ions 1036 in ion bath 1032, the thickness (y) of chemically strengthened layer 1028 may be substantially controlled.

The concentration of Alkali metal ions in an ion bath may be varied while a glass cover is soaking in the ion bath. In other words, the concentration of Alkali metal ions in a ion bath may be maintained substantially constant, may be increased, and/or may be decreased while a glass cover is submerged in the ion bath without departing from the spirit or the scope of the present invention. For example, as Alkali metal ions displace $Na^+$ ions in the glass, the $Na^+$ ions become part of the ion bath. Hence, the concentration of Alkali metal ions in the ion bath may change unless additional Alkali metal ions are added into the ion bath.

The techniques describe herein may be applied to glass surfaces used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

The various aspects, features, embodiments or implementations of the invention described above can be used alone or in various combinations.

Additional details on strengthening edges of glass articles can be found in: (i) U.S. Provisional Patent Application No. 61/156,803, filed Mar. 2, 2009 and entitled "Techniques for Strengthening Glass Covers for Portable Electronic Devices", which is herein incorporated by reference; and (ii)

International Patent Application No. PCT/US2010/025979, filed Mar. 2, 2010 and entitled "Techniques for Strengthening Glass Covers for Portable Electronic Devices", which is herein incorporated by reference.

Additional details on chemical strengthening processing using different chemical baths can be found in U.S. Provisional Patent Application No. 61/301,585, filed Feb. 4, 2010 and entitled "Techniques for Strengthening Glass Covers for Portable Electronic Devices," which is hereby incorporated herein by reference.

Although only a few embodiments of the invention have been described, it should be understood that the invention may be embodied in many other specific forms without departing from the spirit or the scope of the present invention. By way of example, the steps associated with the methods of the invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for strengthening a piece of glass, said method comprising:
    enhancing the piece of glass by placing the piece of glass in a first sodium solution for a first period of time to migrate sodium ions into the piece of glass; and
    following the enhancing, chemically strengthening the piece of glass by placing the piece of glass in a potassium solution for a second period of time to exchange potassium ions for sodium ions in the piece of glass, the first period of time being less than the second period of time;
    following the chemically strengthening, back exchanging the piece of glass by placing the piece of glass in a second sodium solution for a third period of time to back exchange sodium ions for potassium ions to move a compressive maximum inward approximately 70 microns from an outer edge of the piece of glass; and
    following the back exchanging, post-processing the piece of glass by polishing the piece of glass, wherein:
    the piece of glass is a cover glass for a portable electronic device; and
    the piece of glass has a thickness of less than 1.0 mm.

2. The method as recited in claim 1, wherein the portable electronic device is a mobile phone.

3. The method as recited in claim 1, wherein the first sodium solution is a heated sodium solution.

4. The method as recited in claim 1, wherein the potassium solution includes a heated potassium solution.

5. The method as recited in claim 4, wherein the second sodium solution is a heated sodium solution.

6. The method as recited in claim 1, wherein the enhancing of the piece of glass allows the chemical strengthening to be more effective.

7. The method of claim 1, wherein the exchange of potassium ions for sodium ions in the piece of glass forms a compression layer near the outer edge of the piece of glass having a depth of approximately 50 microns.

8. A glass strengthening system for glass articles, comprising:
    a first bath station providing a first sodium solution, the first bath station serving to receive a glass article for a first period of time and to migrate sodium ions from the first sodium solution into the glass article to make it more susceptible to chemical strengthening;
    a second bath station providing a potassium solution, the second bath station serving to receive the glass article for a second period of time following the first bath station and to exchange potassium ions for sodium ions within the glass article, the first period of time being less than the second period of time; and
    a third bath station providing a second sodium solution, the third bath station serving to receive the glass article for a third period of time following the second bath station and to back exchange potassium ions for sodium ions within the glass article to move a compressive maximum inward approximately 70 microns from an outer edge of the glass article, wherein:
    the glass article has a thickness of less than 1.0 mm, and
    the glass article is a cover glass for a portable electronic device.

9. The glass strengthening system as recited in claim 8, wherein:
    the first sodium solution is heated to a first predetermined temperature; and
    the potassium solution is heated to a second predetermined temperature.

10. The glass strengthening system as recited in claim 8, wherein the glass article is alumina silicate glass.

11. The glass strengthening system as recited in claim 8, wherein the portable electronic device is a mobile phone.

12. A method for processing a glass piece to improve its strength, the method comprising:
    submerging the glass piece in a first heated sodium bath for a first period of time to migrate sodium ions from the first heated sodium bath into exposed surfaces of the glass piece;
    following submerging the glass piece in the first heated sodium bath, submerging the glass piece in a heated potassium bath for a second period of time to exchange potassium ions in the heated potassium bath for sodium ions in the glass piece to form a strengthened layer, the first period of time being less than the second period of time;
    wherein a depth of the strengthened layer of the glass piece depends on the second period of time in the heated potassium bath;

following the submerging the glass piece in the heated potassium bath, submerging the glass piece in a second heated sodium bath for a third period of time to back exchange sodium ions in the second heated sodium bath for potassium ions in the strengthened layer of the glass piece to move a compressive maximum inward approximately 70 microns from an outer edge of the glass piece; and attaching the glass piece to a portable electronic device, the glass piece serving as a portion of an outer surface of a housing of the portable electronic device.

13. The method as recited in claim 12, wherein the portable electronic device is a mobile phone.

14. The method as recited in claim 12, wherein the glass piece has a thickness of not more than 1.0 mm.

15. The method as recited in claim 12, wherein the glass piece is a cover glass for the portable electronic device.

16. A method for processing a glass piece to improve its strength, the method comprising:

submerging the glass piece in a first heated sodium bath for a first period of time to migrate sodium ions from the first heated sodium bath into the glass piece, the first heated sodium bath having a temperature of about 350-450 degrees Celsius;

subsequent to submerging the glass piece in the first heated sodium bath, submerging the glass piece in a heated potassium bath for a second period of time to chemically strengthen the glass piece by exchanging potassium ions in the heated potassium bath for sodium ions in the glass piece;

subsequent to submerging the glass piece in the heated potassium bath, submerging the glass piece in a second heated sodium bath for a third period of time to back exchange sodium ions in the second heated sodium bath for potassium ions in the glass piece to move a compressive maximum inward approximately 70 microns from an outer edge of the glass piece; and attaching the glass piece to a portable electronic device, the glass piece serving as a portion of an outer surface of a housing of the portable electronic device.

17. The method of claim 16, wherein the first period of time is approximately between 4-8 hours and the second period of time is approximately between 6-20 hours.

18. The method of claim 16, wherein the heated potassium bath has a temperature of approximately between 300 to 500 degree Celsius.

19. The method of claim 16, wherein the third period of time is approximately between 1-30 minutes and the second heated sodium bath has a temperature of approximately between 300 to 500 degree Celsius.

20. The method of claim 16, wherein following migrating sodium ions from the first heated sodium bath into the glass piece, the glass piece is able to be chemically strengthened to an extent greater than it would be without migrating the sodium ions.

\* \* \* \* \*